(12) United States Patent
Romero

(10) Patent No.: US 8,468,978 B1
(45) Date of Patent: Jun. 25, 2013

(54) PAW COVERS

(76) Inventor: Marvin R. Romero, Florence, AZ (US)

( * ) Notice: Subject to any disclaimer, the term of this patent is extended or adjusted under 35 U.S.C. 154(b) by 0 days.

(21) Appl. No.: 13/073,584

(22) Filed: Mar. 28, 2011

Related U.S. Application Data

(60) Provisional application No. 61/317,875, filed on Mar. 26, 2010.

(51) Int. Cl.
*A01K 29/00* (2006.01)
*A61D 9/00* (2006.01)

(52) U.S. Cl.
USPC .......................................................... 119/850

(58) Field of Classification Search
USPC .................... 119/851, 850; 36/111; 54/82
See application file for complete search history.

(56) References Cited

U.S. PATENT DOCUMENTS

| | | | | |
|---|---|---|---|---|
| 2,475,417 A * | 7/1949 | Wysowski | ........................ | 36/145 |
| 6,863,033 B1 * | 3/2005 | Fleming | ........................ | 119/850 |
| 7,584,721 B2 * | 9/2009 | Vogelman | ...................... | 119/850 |
| 8,176,880 B2 * | 5/2012 | Hurwitz | ......................... | 119/850 |
| 2007/0175410 A1 * | 8/2007 | Vogelman | ...................... | 119/850 |
| 2010/0206242 A1 * | 8/2010 | Jones | ............................. | 119/601 |
| 2011/0036307 A1 * | 2/2011 | Walker | ........................... | 119/851 |
| 2011/0041779 A1 * | 2/2011 | Hurwitz | ........................ | 119/850 |

* cited by examiner

*Primary Examiner* — Yvonne Abbott

(74) *Attorney, Agent, or Firm* — Kenneth L Tolar

(57) ABSTRACT

A paw cover for pets include a base sheet having a plurality of protective shield sets adhesively attached thereto. Each shield set is formed of a plurality of panels, each of which is dimensioned and configured to overlay a designated digital or metacarpal pad on a pet's paw. Each panel includes a strong adhesive on an upper surface that is exposed by removing an overlying protective sheet. To protect a pet's paws, a pet owner removes the protective sheet and positions each paw pad upon a designated panel. When the paw is lifted, the panels are separated from the base sheet and adhere to the paw pads to protect the paw from hot or potentially-injurious surfaces.

7 Claims, 1 Drawing Sheet

PAW COVERS

CROSS REFERENCE TO RELATED APPLICATIONS

This application is entitled to the benefit of provisional application No. 61/317,875 filed on Mar. 26, 2010, the specification of which is incorporated herein by reference.

BACKGROUND OF THE INVENTION

The present invention relates to adhesive shields for protecting a pet's paws from hot surfaces or sharp objects.

DESCRIPTION OF THE PRIOR ART

When walking a pet, an owner must often traverse hot pavement or asphalt that can hurt or injure the pet's paws. Furthermore, the paws can be penetrated by thorns, rocks, glass or other sharp objects. Accordingly, there is currently a need for a device that protects a pet's paws when traversing certain surfaces. The present invention addresses this need by providing a protective shield that is adhesively secured to each of a pet's paw pads.

SUMMARY OF THE INVENTION

The present invention relates to paw covers for pets comprising a base sheet having a plurality of protective shields adhesively attached thereto. Each shield is formed of a plurality of panels, each of which is dimensioned and configured to overlay a designated pad on a pet's paw. Each panel includes a skid-resistant, silicone-rubber lower layer, a thin, plastic intermediate layer with a strong adhesive upper layer superimposed thereon. The adhesive is exposed by removing an overlying protective sheet. To protect a pet's paws, a pet owner removes the protective sheet and positions each paw pad upon a corresponding panel. When the paw is lifted, the panels are separated from the base sheet and adhere to the pet's paw pads to protect the paw from hot surfaces or sharp objects.

It is therefore an object of the present invention to provide a device that protects a pet's paws from hot surfaces and sharp objects.

It is another object of the present invention to provide paw covers that are easily fastened.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
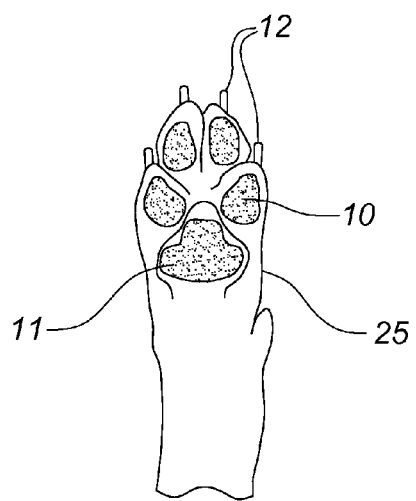
FIG. 1 is a bottom, plan view of a pet's paw.
Figure 2:
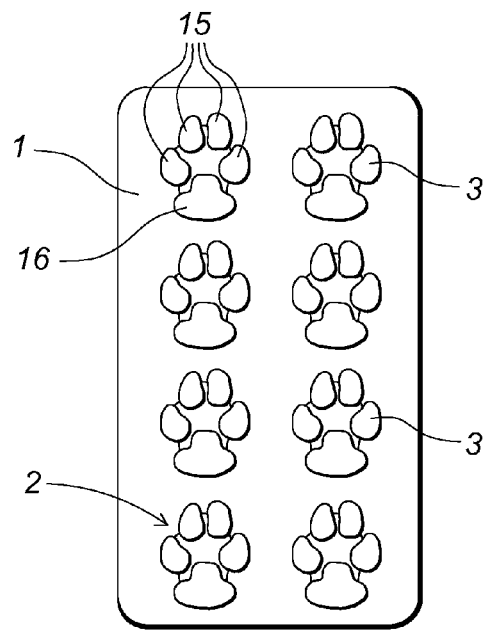
FIG. 2 is a plan view of the base sheet with a plurality of shields according to the present inventions secured thereto.
Figure 3:
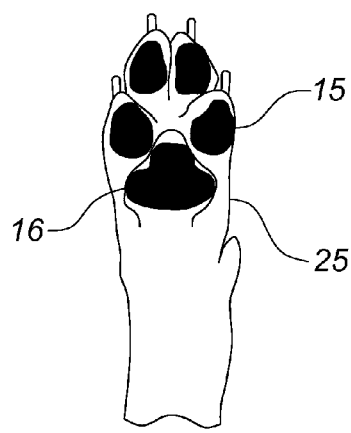
FIG. 3 depicts the paw of FIG. 1 with the shields according to the present invention fastened thereto.
Figure 4:
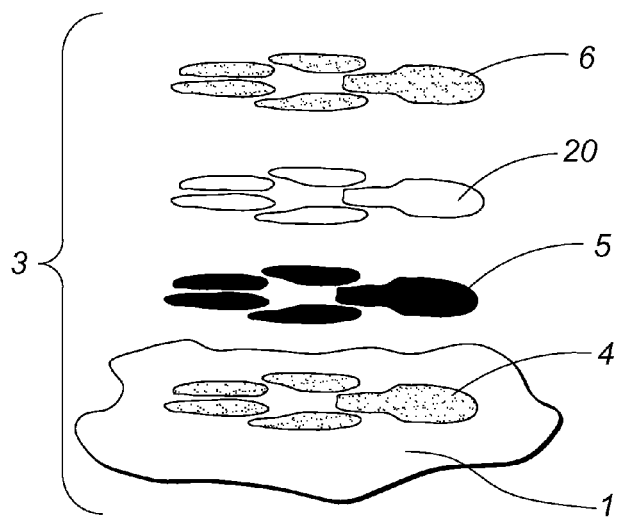
FIG. 4 is an exploded view of an exemplary shield.

The present invention relates to paw covers for preventing injuries to pets when walking on a hot or potentially injurious surfaces. A pet's paw 25 comprises, inter alia, four digital pads 10 near a front end from which claws 12 extend and a metacarpal or primary pad 11 on a central portion. Pets can incur severe pain and discomfort when such pads engage hot pavement or are penetrated by thorns and other sharp objects. The covers according to the present invention are designed to overlay and protect the digital and metacarpal pads as described above.

The cover includes a base sheet 1 having a plurality of protective shield sets 2 removably attached thereto. The shield sets are secured to the sheet with a low-adherence, repositionable adhesive so as to be easily separate therefrom with a minimal lifting force. Each shield set is formed of a plurality of panels 3, each of which is dimensioned and configured to overlay a select pad on a pet's paw. For example, four 15 of the panels have the same dimension and outline as the four digital pads 10 on a desired animal while a fifth 16 has the same dimension and outline as the desired animal's metacarpal pad 11. As such, the pads will vary in size according to the intended animal, i.e., large dog, small dog, medium dog, or a cat. Each panel includes a skid-resistant, silicone-rubber lower layer 4 that prevents slipping on most surfaces and a thin, plastic intermediate layer 5 that prevents puncturing and provides a thermal barrier between the paw and an underlying surface. Superimposed on the intermediate layer is an ultrahigh-adherence adhesive 20 that is selectively exposed by removing an overlying protective sheet 6.

To protect a pet's paws, a pet owner removes the protective sheet 6 and positions each paw pad upon a designated panel. When the paw is lifted, the panels are separated from the base sheet and adhere to the paw pads to protect the paw from hot or piercing surfaces.

As readily seen from the detailed description above, the present invention provides an improved paw cover that employs separate designated panels for each paw pad. Accordingly, the pet hardly notices the cover once applied as opposed to any unitary shoe or boot-type covering.

The above-described device is not limited to the exact details of construction and enumeration of parts provided herein. For example, the number, size and shape of the digital and primary panels as well as the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A method of protecting a pet's paw comprising the steps of:
    providing at least one digital panel having a similar outline and dimension as a digital pad on the pet's paw;
    providing at least one metacarpal panel having a similar outline and dimension as a metacarpal pad on the pet's paw;
    adhesively securing said digital panel to the digital pad;
    adhesively securing the metacarpal panel to the metacarpal pad.

2. A method of protecting a pet's paw comprising the steps of:
    providing at least one digital panel having a similar outline and dimension as a digital pad on the pet's paw;
    providing at least one metacarpal panel having a similar outline and dimension as a metacarpal pad on the pet's paw;
    tenuously securing a lower surface of said digital panel and a lower surface of said metacarpal panel to a sheet;

placing a strong adhesive on an upper surface of said digital panel and said metacarpal panel;

positioning the pet's paw on said sheet with said digital pad resting on said digital panel and said metacarpal pad resting on said metacarpal panel;

lifting said pet's paw to automatically transfer said digital panel and said metacarpal panel from said sheet to said pet's paw.

3. A paw cover comprising:

at least one digital panel having a similar outline and dimension as a digital pad on a select animal's paw, said digital panel having an upper surface and a lower surface;

at least one metacarpal panel having a similar outline and dimension as a metacarpal pad on a select animal's paw, said metacarpal panel having an upper surface and a lower surface;

means for attaching said digital panel to said digital pad;

means for attaching said metacarpal panel to said metacarpal pad;

wherein said means for attaching said digital panel to said digital pad and said means for attaching said metacarpal panel to said metacarpal pad comprises a strong adhesive on the upper surface of said digital panel and said metacarpal panel.

4. The cover according to claim 3 wherein said digital panel and said metacarpal panel are secured to a base sheet with a weak adhesive to allow a pet to step onto and off of said digital panel and said metacarpal to quickly and easily secure said digital panel and said metacarpal to said digital pad and said metacarpal pad.

5. The cover according to claim 3 wherein said metacarpal panel and said digital panel each include a skid-resistant, silicone-rubber lower layer.

6. The cover according to claim 3 wherein said metacarpal panel and said digital panel each include and a thin, plastic intermediate layer to prevent piercing of said digital panel and said metacarpal and to provide a thermal barrier between either of said digital panel and said metacarpal, and an underlying surface.

7. The cover according to claim 3 wherein said strong adhesive is selectively exposed by a removable, overlying protective sheet.

\* \* \* \* \*